A & C. Clow.

Gavel Fork.

No. 2758. Reissued Sept. 3. 1867.

Witnesses;
William Tracy
D. Curran by
Bredersheim & Co
Attys

Inventor;
Abram Clow
Charles Clow

United States Patent Office.

ABRAM CLOW AND CHARLES CLOW, OF PORT BYRON, NEW YORK, ASSIGNEES OF CHARLES CLOW, ABRAM CLOW, AND CHARLES N. CLOW.

*Letters Patent No.* 18,804, *dated December* 8, 1857; *reissue No.* 2,758, *dated September* 3, 1867.

IMPROVEMENT IN AGRICULTURAL FORKS.

The Schedule referred to in these Letters Patent and making part of the same.

TO ALL WHOM IT MAY CONCERN.

Be it known that ABRAM CLOW, CHARLES CLOW, and CHARLES N. CLOW, of Port Byron, in the county of Cayuga, and State of New York, invented a new and useful Improvement in Grain-Fork; and we do hereby declare that the following is a full, clear, and exact description thereof, which will enable those skilled in the art to make and use the same, reference being had to the accompanying drawings, forming part of this specification, in which—

Similar letters of reference indicate like parts in all the figures.

Figure 1:
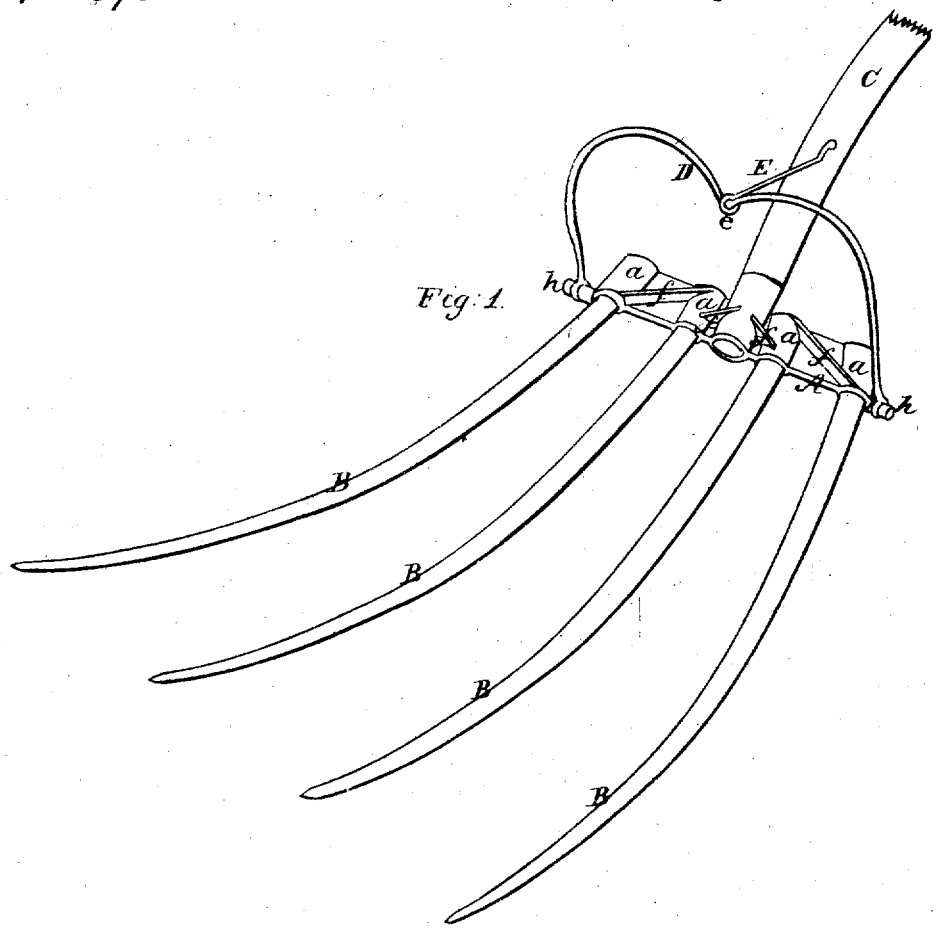
Figure 1 is a face view of our invention.

Heretofore in the construction of grain-forks wooden heads have been used, the tines of such a fork being secured in the head by forming a tenon on the base of each tine, and driving it into a suitable mortise in the wooden head, the tines being driven in from the front side of the head. These forks have this objection: the head is liable to be split by the leverage of the tines when in use, unless the head is made so heavy as to be cumbersome and clumsy; and the tines project from the head squarely to the front, or have no lateral spread at the point of the fork, and thus require a long and heavy head in order to get a sufficient width of fork. In this class of fork tines of thirty inches in length are used; and, however well made, it is a difficult matter, if not an impossibility, to combine in such construction strength and durability with useful proportions and neatness. The tines are also apt to work loose with use, and by the swelling and shrinking of the parts. To obviate these objections we use a malleable, cast-iron, or metallic head, which gives the desired durability and strength with light and symmetrical proportions, and greatly enhances the practical value of this implement.

This invention consists in the employment of a metallic head in connection with the long wooden tines of this class of fork; also, in an improved arrangement of cast metallic ribs or braces between the sockets of the head, for obtaining the greatest strength with lightness of head; also, in the use of conical sockets, tapering from the rear to the front side of the head, so that the tapering tines may be driven in from the rear side of the head, and wedged or seated so firmly in their sockets that they remain permanently fixed and rigid in their positions; also, in forming the tine-sockets in the head at a diverging angle with relation to each other, so that the head may be contracted in length, for diminishing its weight, and the fork retain its spread of tines at its point as before; also, in attaching the brace and bow of the fork to each other in such manner as to fold together, for packing, without being detached from each other; and, further, our invention consists in hinging or jointing the bow to the head in such a manner as to be capable of being folded down upon the tines of the fork when released by the brace, as hereinafter more fully explained.

In the accompanying drawings, A is a metallic head; B B are the wooden tines; C is the handle; D the bow, and E the brace. The head A has conical sockets *a a*, (fig. 3,) tapering from the rear of the head towards its front. The tines B are turned in a tapering form, from point to base, and are then steamed, bent to the proper curve, and thoroughly dried or seasoned, when they are ready for driving. They are driven in from the rear side of the head, and begin to fill up and jam in their sockets at a point some inches from their base; but, being forced forward, they are very firmly and securely fixed in position by the time they are fully seated, and without liability of rupturing the head.

Figure 3:
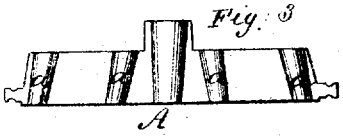
Figure 3 is a vertical longitudinal section of the head, taken through its centre.

For diminishing the weight of the head, and for making a saving of material, we contract the head in length; and are enabled to do this and maintain a proper width of fork by arranging the sockets *a a* so that from the rear to the front of the head they diverge laterally with relation to each other, as shown in fig. 3.

In the construction of wooden forks it is difficult to get exactly the proper curve in all the teeth, owing to difference of fibre in the wood; and, when the fork is made, the tines are driven, and their points then brought into line with each other by twisting the metallic head between the sockets; also, after the fork has gone into use, some of the tines straighten out more or less by dampness, and then the same method is resorted to for bringing the points of the tines in line again. This is an important advantage that a metallic head has over a wooden one, as for this reason crooked or bent tines can be used only in a metallic head.

Figure 2:
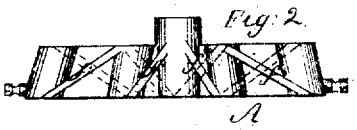
Figure 2 is a front view of the metallic head.

The head A is cast with a thin web between the sockets; and on this web we cast oblique braces or ribs *f*. These ribs are placed crossing, with relation to each other, upon opposite sides of the head, as shown in fig. 2, in which the ribs *f* of one side of the head are shown, while the disposition of the ribs on the other side of the head is indicated by dotted lines. By this means we obtain the best disposition of the metal for resisting the twisting strain to which the head is subjected by use. The brace E is attached to the bow D by a hinge-joint, *e*, so that the brace and bow may be folded together for packing without detaching them from each other. The bow D is also hinged or pivoted to each end of the head by joints *h h*, fig. 1, so that, when the brace E is detached from the handle C, the bow may be laid down on the tines of the fork, and, the brace being folded in with it, they are made to pack close for transportation. By these means the fork is made durable, light, and strong, and not subject to get out of order, and the packing of forks for shipment is facilitated.

Having thus described our invention, what we claim as new, and desire to secure by Letters Patent, is—

1. We claim, in combination, the metallic head A and wooden tines B, substantially as and for the purpose herein specified.

2. The arrangement of the ribs or braces *f*, running obliquely from socket to socket, and crossing, with relation to each other, upon opposite sides of the head, as and for the purpose set forth.

3. The arrangement of the sockets *a a*, diverging laterally from the rear to the front of the head, in the manner shown and for the purpose set forth.

4. The conical sockets *a*, when made tapering from the rear of the head towards its front, in connection with the wooden tines B and metallic head A, substantially in the manner and for the purpose set forth.

5. The brace E and bow D, when attached to each other with a hinge-joint, so as to fold together without being detached from each other, substantially in the manner and for the purpose described.

6. The jointing of the bow D on to the head, for the purpose and in the manner substantially as described.

ABRAM CLOW,
CHARLES CLOW.

Witnesses:

HOWELL B. CONVERSE,
RICHARD H. HOFF.